United States Patent Office 3,558,694
Patented Jan. 26, 1971

---

3,558,694
PESTICIDALLY ACTIVE KETO ACID SUBSTITUTED CHLORINATED POLYCYCLIC KETONE $C_{10}Cl_{10}O$
Theodore Largman, Morristown, and Peter Edward Newallis, Morris Plains, N.J., assignors to Allied Chemical Corporation, New York, N.Y., a corporation of New York
No Drawing. Filed Dec. 23, 1966, Ser. No. 604,149
Int. Cl. C07c 61/36, 65/20
U.S. Cl. 260—514  2 Claims

ABSTRACT OF THE DISCLOSURE

Pesticidally active adducts of decachlorooctahydro-1,3,4-metheno-2H-cyclobuta(cd)-pentalen-2-one with alkylidene, cycloalkylidene and phenylene keto acids, and method for controlling pests therewith.

---

This invention relates to new keto acid substituted decachlorooctahydro-1,3,4-metheno - 2H - cyclobuta(cd)-2-hydroxypentalene, to their alkali metal salts, to a method for preparing the acids, to new pesticidal compositions containing said compounds and to a method for combatting pests, especially insect pests including roaches and beetles, with the new pesticidal compositions.

The new compounds of our invention, which may be referred to as adducts, have the structure

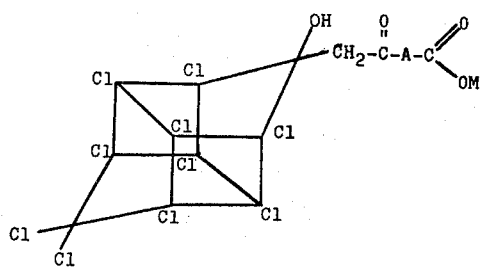

wherein A is a member selected from the group consisting of alkylidene radicals, cycloalkylidene radicals and the phenylene radical, preferably such radicals containing no more than 10 carbon atoms, and M is hydrogen or an alkali metal.

The adducts of our invention are prepared by reacting decachlorooctahydro-1,3,4-metheno-2H-cyclobuta(cd)-pentalen-2-one, hereinafter called chlorinated polycyclic ketone, with an alkylidene, cycloalkylidene or phenylene keto acid as defined, dispersed or dissolved in a liquid reaction medium which is a common solvent for both reactants, at temperatures between about 20° C. and about 250° C., according to the equation shown below:

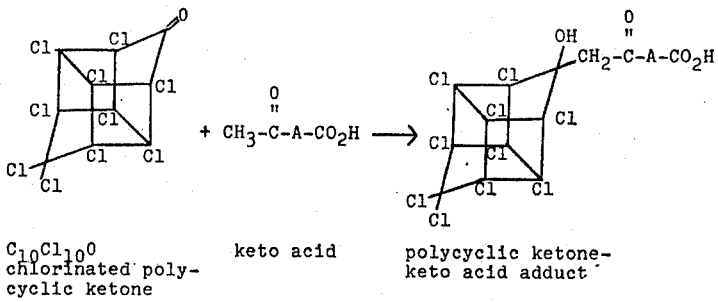

$C_{10}Cl_{10}O$      keto acid      polycyclic ketone-
chlorinated poly-                      keto acid adduct
cyclic ketone Among the keto acids which can be reacted with the chlorinated polycyclic ketone are:

levulinic acid ($CH_3$—CO—$CH_2$—$CH_2$—COOH),
4-acetyl butyric acid ($CH_3$—CO—$CH_2$—$CH_2$—COOH),
5-acetyl pentanoic acid ($CH_3$—CO—$(CH_2)_4$—COOH),
6-acetyl hexanoic acid ($CH_3$—CO—$(CH_2)_5$—COOH),
pinonic acid

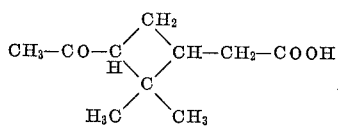

and 2-acetyl benzoic acid

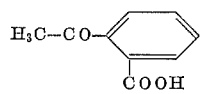

If the chlorinated polycyclic ketone is available in hydrate form, it can be dehydrated before reaction by heating it in an oven at temperature of about 135° to 150° C. or by refluxing it with an aromatic solvent such as xylene to remove the water. The water can also be removed during reaction, as described below.

Although the reactants may be employed in mol ratio of about 0.5 to 2 mols of polycyclic ketone per mol of keto acid, it is preferred to use approximately equimolar proportions of the reactants.

The reaction is carried out at room temperature to about 250° C., usually at temperature of about 55° to 200° C. The reaction temperature is preferably the reflux temperature of the reaction mixture.

If desired, the reaction may be carried out in the presence of an organic solvent. The solvent must be inert to the reactants and the desired keto acid adduct. Among the suitable solvents are aliphatic or aromatic hydrocarbons such as xylene, toluene, benzene, petroleum ether, methylene chloride, etc. The solvent serves to keep the adduct in solution. Moreover, if the polycyclic ketone is employed in hydrate form, the solvent enables dehydration thereof during the reaction.

The keto acid adducts may be recovered from the reaction mixture by procedures known in the art, as by precipitation with a non-solvent, e.g. hexane, followed by filtration and drying. The adducts may be purified, for example, by recrystallization from hexane.

Preparation of the alkali metal salts of the adduct acids can be accomplished by reacting the adduct with an alkali metal hydroxide in alcohol solution, for example, a lower aliphatic alcohol of from 1 to 8 carbon atoms.

Other metallic salts can readily be prepared from the alkali metal salts in known manner, for example, by heating the alkali metal salt with a solution of a salt of the metal which is to replace the alkali metal, for example, in an aqueous or alcoholic solvent. In this manner a wide variety of salts of the new adducts can be prepared including those of copper, tin, magnesium, zinc, iron, manganese, etc.

The chlorinated polycyclic ketone-keto acid adducts of our invention are solids, soluble in polar solvents such as alcohols and slightly soluble in aromatic hydrocarbons. The alkali metal salts are less soluble in aromatic solvents than the corresponding acids.

The new adducts of our invention and their alkali metal salts are useful as pesticides, and the levulinic acid-chlorinated polycyclic ketone adduct and its alkali metal salts have outstandingly high toxicity against roaches and beetles especially against many of the more resistant cockroaches and against beetles such as the Colorado potato beetle.

The compounds of our invention have strong biocidal activity also in other fields and are active against house flies as well as against a number of the so-called stored product insects including the southern armyworm. They can be employed in a number of important fields to combat or control such pests by contacting the pests either directly or by application of the compounds to the environment, habitat or host of the pest.

The chlorinated polycyclic ketone-keto acid adducts of this invention may be applied to pests, especially insects, "as is" but are advantageously incorporated as ingredients in suitable liquid or solid carriers to provide pesticidal spray or dust compositions.

The liquid pesticidal compositions generally contain in proportions by weight about 10 to 25% of the adduct as active ingredients, about 65 to 88% of an aromatic solvent and about 2 to 10% of a suitable wetting or emulsifying agent, such as diglycol oleate, p-isooctyl phenyl ether of polyethylene glycol, blends of alkyl aryl polyether alcohols with alkyl aryl sulfonates and blends of polyoxyethylene sorbitan esters of mixed fatty and resin acids with alkyl aryl sulfonates. The resulting concentrate solution is diluted or admixed with water to form an aqueous dispersion or emulsion suitable for spray application containing about 0.001 to 0.1% by weight of active ingredient.

Representative aromatic solvents which may be used in preparing the liquid pesticidal compositions include xylene, high aromatic solvents, methylated naphthalenes, heavy aromatic naphtha, etc. It is an advantage of this invention that the adducts have substantially greater solubility in aromatic solvents than the polycyclic ketone per se.

The wettable powder compositions generally contain in proportions by weight about 25 to 75% of the active ingredient, about 20 to 73% of a finely divided solid carrier and about 2 to 5% of suitable wetting and dispersing agents. Typical wetting agents include polyether sulfonates, alkyl aryl sulfonates, etc. Typical dispersing agents include ligninsulfonates, naphthalene sulfonic acid-formaldehyde condensates, etc.

The wettable powder compositions can readily be prepared by mixing or milling the active ingredient with the carrier and wetting agent to a typical particle size of from about 3 to 40 microns. The composition is admixed with water to form an aqueous dispersion suitable for spraying containing about 0.001 to 0.1% by weight of active ingredient.

Representative solid carriers which may be used in preparing the wettable powders include magnesium and aluminum silicates (talc, kaolin clays, attapulgite clays, etc.), carbonates (dolomite, chalk, etc.), materials containing silicic acid (diatomaceous earth), fuller's earth, gypsum, sulfur, etc.

The dosage of the active ingredient depends on the particular organisms to be controlled, field conditions, etc., as known in the art. In any event, sufficient quantity of the active ingredient is used to provide the desired toxicity.

The following specific examples further illustrate our invention. Parts are by weight, except as otherwise noted.

EXAMPLE 1

Preparation of levulinic acid adduct

To 30 grams of the chlorinated polycyclic ketone $C_{10}Cl_{10}O$ described above, dissolved in 43 grams (50 ml.) of xylene, was added 10 grams of levulinic acid. The mixture was refluxed overnight and the water formed was removed in a Dean-Stark trap. The dehydrated solution was cooled, whereupon 35 grams of the adduct precipitated and was recovered by filtration. The adduct had a melting point of 220°–226° C. and on infrared analysis gave hydroxyl bands at 3320 and 3100–3600 cm.$^{-1}$ and carbonyl bands at 1705 and 1680 cm.$^{-1}$. It has the structure shown below

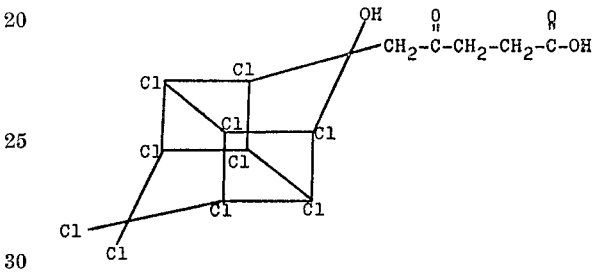

EXAMPLE 2

Preparation of potassium and sodium salts from acid

The levulinic acid-chlorinated polycyclicketone adduct obtained in Example 1 above was converted to its potassium salt by mixing 6.07 grams (0.01 mole) of the adduct and 0.6 gram of KOH in 50 ml. of methanol and stirring the mixture at ambient temperatures (ca. 20–25° C.) for ½ hour. The mixture was filtered and the methanol removed by volatilization leaving 6.6 grams of potassium salt product which had a melting point of 241°–245° C. and analyzed as follows Found: C, 26.3%; H, 1.7%. Theory $C_{15}H_7Cl_{10}K \cdot 2H_2O$: C, 26.4%; H, 1.6% (M.W., 681).

The product was, therefore, the dihydrate having the structure shown below:

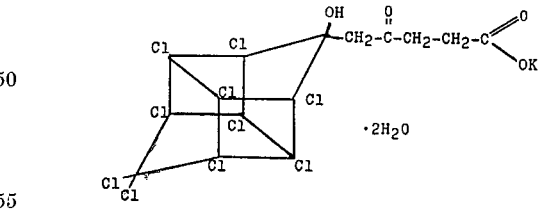

When NaOH is substituted for KOH in the above procedure, the corresponding sodium salt is produced.

EXAMPLE 3

Preparation of ethyl ester

The levulinic acid-chlorinated polycyclicketone adduct obtained in Example 1 above was converted to its ethyl ester as follows: Thirty-five grams of the acid adduct was dissolved in 160 grams (200 ml.) of absolute ethanol and 8.8 grams (10 ml.) of benzene. Then 0.92 gram (0.5 ml.) of concentrated sulfuric acid was added. The resulting mixture was refluxed (76° C.) four hours then was filtered. The adduct-containing filtrate was heated to flash off alcohol, then cold hexane was added, whereupon the ester precipitated and was filtered off, yielding 13 grams of ethyl ester. The mother liquor was diluted with additional hexane and yielded 15 grams of ester making a total of 28 grams, equivalent to 76% of theory. The resulting ester had a melting point of 91° C. and had the characteristic infrared spectrum of the ethyl levulinate adduct of the $C_{10}Cl_{10}O$ polycyclic ketone. Its structure is shown below.

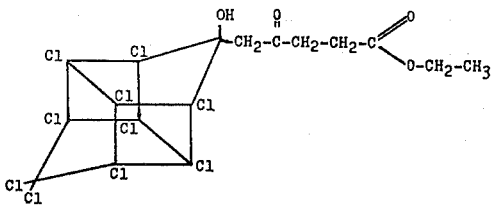

EXAMPLE 4

Preparation of sodium salt from ester

The ethyle levulinate ester adduct was converted into the sodium salt of the acid as follows:

Fifty grams of the ester was dissolved in 250 grams of isopropyl alcohol and 200 ml. of 1 N NaOH was added. The mixture was stirred overnight at ambient temperature (ca. 20°–25° C.), whereupon the sodium salt precipitated and was filtered and dried. The resulting sodium salt decomposed at 260° C. Its infrared spectrum showed bands for OH at 3320 cm.$^{-1}$ and for C=O at 1690–1720 cm.$^{-1}$ respectively. Analysis showed Found: C, 25.1%; H, 2.14%; Na, 3.5%; $H_2O$, 12.2%. Theory for tetrahydrate: C, 25.7%; H, 2.14%; Na, 3.3%; $H_2O$, 10.3%.

It has the structure shown below

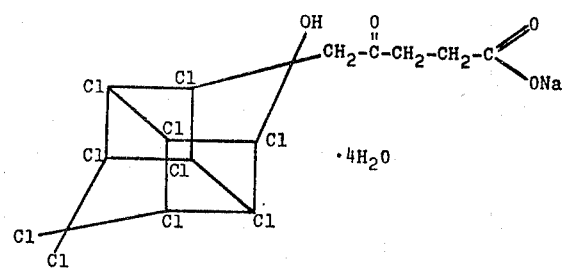

EXAMPLE 5

Preparation of acetyl benzoic acid adduct

To 14 grams of the $C_{10}Cl_{10}O$ polycyclic ketone dissolved in 100 grams of toluene were added 4 grams of 2-acetyl benzoic acid and the mixture was heated at 80° C. for 17 hours (overnight). The resulting solution was evaporated in vacuo leaving a tan solid. The solid was recrystallized from $CCl_4$ yielding 11 grams of the adduct whose infrared spectrum showed carbonyl absorption at 5.74μ, and OH absorption at 3.05μ. It partially liquefied at 120°–130° C., then turned solid and melted completely at 230° C. It has the structure

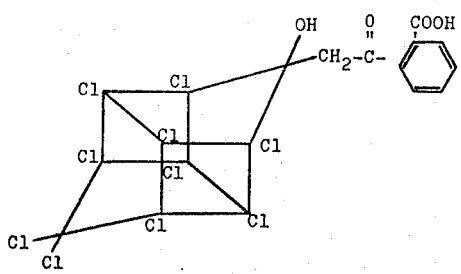

EXAMPLE 6

Preparation of pinonic acid adduct

To 9.0 grams (0.0183 mole) of polycyclic ketone $C_{10}Cl_{10}O$, dissolved in 100 grams of xylene was added 3.5 grams of pinonic acid,

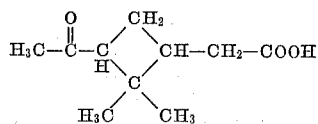

The mixture was refluxed six hours, then cooled. To the mixture was added 100 ml. of hexane, whereupon a solid precipitate formed which was filtered off and dried yielding 10.5 grams of a compound melting at 175°–178° C. with previous softening. Its infrared spectrogram showed split carbonyl absorptions. Analysis showed Found: C, 35.9%; H, 2.5. Theory: C, 35.6%; H, 2.4%.

Its structure is

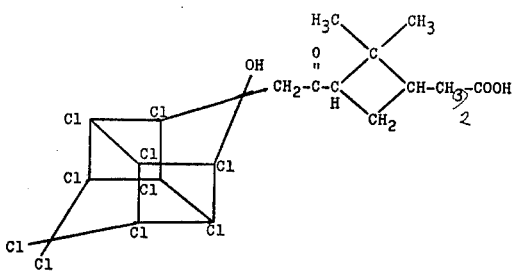

EXAMPLE 7

Preparation of 4-acetylbutyric acid adduct

To 24.6 grams (0.05 mole) of the chlorinated polycyclic ketone $C_{10}Cl_{10}O$, dissolved in 50 ml. of xylene was added 6.6 grams (0.05 mole) of 4-acetylbutyric acid. The mixture was refluxed for 4 hours, after which the xylene was flashed off under reduced pressure. Then 100 ml. of hexane was added to the mixture which was then stirred for one hour during which time the product precipitated. The solid was filtered off and dried, yielding 28.0 grams of a tan powder having a melting point at 139°–140° C. Analysis showed Found: C, 32.0%; H, 1.9%. Theory: C, 30.9%; H, 1.61%.

Its structure is

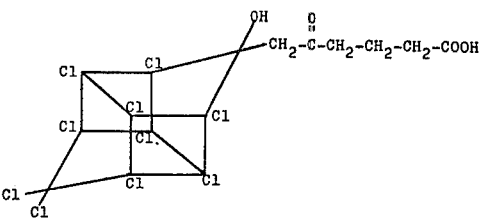

The chlorinated polycyclic ketone-acetyl butyric acid adduct shown above was converted to its potassium salt as described in Example 2 above. The potassium salt was then converted to the corresponding manganese salt by heating a solution of the salt in methanol with $MnCl_2 \cdot 4H_2O$.

EXAMPLE 8

The levulinic acid/decachloropolycyclic ketone adduct and its sodium salt were tested for insecticidal activity against several species of cockroaches, namely, German cockroach, *Blattella germanica*; Oriental cockroach, *Blattella arientalis*; American cockroach, *Periplaneta americana*; and the brown-banded roach, *Supella supellectilium*, as follows:

Roach tests

Dry baits were prepared containing 1 part powdered sugar and 3 parts of corn meal with which were mechanically mixed, portions of the several toxicants required to give the desired percentage toxicant in the bait, usually about 0.125% or less. Approximately two grams of the bait is placed in a paper cup and the cup placed into a gallon glass (mason) jar. The roaches to be tested are anesthetized with $CO_2$ and adults or nymphs are placed in each jar. A vial of water with a cellucolton wick is provided in each jar to insure adequate moisture. Mortality observations are then made daily for 10 days.

Results of the tests are shown in Table I below:

TABLE I.—ROACH MORTALITIES WITH TOXICANTS OF EXAMPLE 1

| Compound | Percent in bait | Roach species | Percent kill days | | | | | | | |
|---|---|---|---|---|---|---|---|---|---|---|
| | | | 1 | 2 | 3 | 4 | 5 | 6 | 8 | 10 |
| Levulinic acid adduct | 0.125 | German AF | 100 | | | | | | | |
| | 0.0625 | do | 20 | 70 | 70 | 70 | 90 | 100 | | |
| | 0.125 | Oriental A | 90 | 100 | | | | | | |
| | 0.0625 | do | 50 | 60 | | 75 | 75 | | 95 | 95 |
| | 0.125 | American N | 0 | 10 | 10 | 10 | 10 | 10 | | |
| | 0.0625 | Br. banded AF | 30 | 100 | | | | | | |
| Levulinic acid adduct Na salt | 0.125 | German AF | 70 | 100 | | | | | | |
| | 0.0625 | do | 30 | 100 | | | | | | |
| | 0.125 | Oriental A | 40 | 90 | 100 | | | | | |
| | 0.0625 | do | 45 | 65 | | 80 | 90 | | 95 | 100 |
| | 0.125 | Ameri an N | 0 | 10 | 10 | 10 | 10 | 10 | | |
| | 0.0625 | Br. banded AF | 30 | 100 | | | | | | |

NOTE.—A=Adults, mixed male and female; AF=Female adults; N=Nymphs.

It is apparent from the above data that the levulinic acid adduct and its sodium salt both exert outstandingly high toxicity against a variety of roaches even at extremely low concentrations of toxicant.

EXAMPLE 9

Colorado potato beetle tests

The levulinic acid/decachloropolycyclic ketone adduct and its sodium salt were tested for insecticidal activity against Colorado potato beetle larvae, *Leptinotarsa decemlineata*, as follows:

Potato vine terminal cuttings 6″ to 8″ long were sprayed 15 seconds (5 upper surface, 5 underside and 5 lateral surfaces) with a liquid dispersion containing the desired concentration of the toxicant, using an atomizer nozzle operated in a spray hood. Then larvae of the Colorado potato beetle were caged over treated terminals by screen wire hemispheres. Mortality and feeding records were then made at 24 hour intervals to 3 days. Results of the tests as compared to the ethyl ester (ethyl levulinate) are shown in Table II below:

TABLE II.—TOXICITIES OF LEVULINIC ACID ADDUCT AND ITS SODIUM SALT TO COLORADO POTATO BEETLE LARVAE

| | Concentrate oz./100 gallons | Percent kill, 3 days |
|---|---|---|
| Compound: | | |
| Acid | 0.25 | 100 |
| | 0.125 | 100 |
| | 0.0625 | 100 |
| | 0.03125 | 10 |
| Sodium salt | 0.25 | 100 |
| | 0.125 | 100 |
| | 0.0625 | 100 |
| | 0.03125 | 20 |
| Ethyl ester | 0.25 | 100 |
| | 0.125 | 100 |
| | 0.0625 | 90 |
| | 0.03125 | 50 |

It can be seen from the above tests that the levulinic acid adduct and its sodium salt both have outstanding activity against the Colorado potato beetle, even at extremely low concentrations of toxicant.

EXAMPLE 10

House fly tests

The levulinic acid/decachloropolycyclic ketone adduct was tested for toxicity against house flies, *Musca domestica*, as follows:

Dry food (6 parts powdered, non-fat milk, 6 parts granulated sugar and 1 part powdered egg) was mixed with the toxicant to provide a bait containing 0.25% toxicant. The thus treated food was pulverized and the treated food was placed in emergence cages containing fly pupae. Cages containing untreated food were used as checks. Each cage was then examined periodically to determine emergence, condition of flies and acute toxicity. Results of this test showed 89.6% kill and no eggs laid after 7 days when carried out with bait containing 0.25% toxicant.

EXAMPLE 11

Plum curculio tests

The sodium salt of the levulinic acid adduct was tested for toxicity against the plum curculio (*Conotrachelus nenuphar*) as follows:

A wettable powder formulation was prepared containing 25% toxicant, the remaining 75% being composed of a powder composition of 98% attapulgite clay, 1% of an alkyl aryl sulfonate wetting agent and 1% of polyvinylalcohol. The wettable powder was then dispersed in water in concentrations of 4 ounces and 2 ounces per 100 gallons respectively. Then small green apples were sprayed for 10 seconds with each solution as the apples were revolved on spray cones. Deposits were allowed to dry, after which plum curculio adult beetles were confined over the apples. The beetles were observed daily for mortality. Percent kills over a 7 day period are shown in Table III below:

TABLE III.—TOXICITY OF SODIUM SALT OF LEVULINIC ACID ADDUCT TO PLUM CURCULIO ADULTS

| Ounce salt per 100 gallons | Percent kill days | | | | | |
|---|---|---|---|---|---|---|
| | 1 | 2 | 4 | 5 | 6 | 7 |
| 4 | 30 | 40 | 60 | 70 | 80 | 90 |
| 2 | 0 | 10 | 20 | 20 | 30 | 60 |

EXAMPLE 12

Southern armyworm tests

The levulinic acid adduct and its sodium salt were tested for their toxicity against southern armyworms (*Prodenia eridania*) as follows:

Small quantities of the toxicant were dispersed in a 1:3 mixture of acetone:water to provide solutions containing one ounce and ½ ounce per 100 gallons in the case of the acid; 2 ounces and 1 ounce per 100 gallons in the case of the sodium salt. Then horticultural cranberry bean plants with all foliage removed, except one primary leaf, were sprayed with the toxicant solution, 2 seconds on the upper side and 5 seconds on the under side. After spraying deposits were allowed to dry on the plant, and then 4th and 5th instar larvae were confined on each plant with wire spheres. Mortality observations were made after 3 days. Results of the tests in terms of percent kill are shown in Table IV below:

TABLE IV.—TOXICITY OF LEVULINIC ACID ADDUCT AND ITS SODIUM SALT TO SOUTHERN ARMYWORM LARVAE

| | Ounce Toxicant per 100 gallon | Percent kill after 3 days |
|---|---|---|
| Compound: | | |
| Acid | 1 | 70 |
| Do | ½ | 30 |
| Na salt | 2 | 100 |
| Do | 1 | 40 |

EXAMPLE 13

The chlorinated polycyclic ketone-acetyl benzoic acid adduct of Example 5 was tested for insecticidal activity against southern armyworms (*Prodenia eridania*) by first preparing a solution of the adduct in a 1:1 acetone-water mixture in a concentration of 1 pound of adduct per 100 gallons of solution. Then horticultural cranberry bean plants in 2½ inch pots with all foliage removed, except one primary leaf, were sprayed with the acetone-adduct solution for 2 seconds on the upper leaf surface, 5 seconds on the under surface, using an approximate volume of spray of 0.19 ml. on the upper surface and 0.48 on the under surface. After spraying the deposits were allowed to dry on the plants. Then fourth or fifth instar southern armyworm larvae were confined on each plant with six inch screen wire spheres. Observation of the plants after 2 days showed all larvae dead, representing a 100% kill. Feeding was light.

In a similar test carried out using boll weevil adults (*Anthonimous grandis*) on cotton plants, 60% of the weevils were dead after two days.

EXAMPLE 14

Mexican bean beetle larvae tests

The chlorinated polycyclic ketone-4-acetyl butyric acid adduct of Example 7 was tested as an insecticide against Mexican bean beetle larvae (*Epilachna varivestis*) and southern armyworm larvae (*Prodenia eridania*) as described in Example 13 above, using as spray an acetone solution of the 4-acetyl butyric acid adduct at a concentration of 2 pounds per 100 gallons of spray.

Two days after spraying all of the insects in each test were dead, indicating 100% kill against these insects.

EXAMPLE 15

The chlorinated polycyclic ketone-pinonic acid adduct of Example 6 above was tested for insecticidal properties against German cockroaches (*Blattella germanica*) in the manner described in Example 8 above, using 0.125% of the toxicant in the dry bait with 2 grams of bait in each jar. Roaches of each sex were tested, and observed daily for 10 days, mortality counts being meade each day. Percent mortalities are listed in Table V below:

TABLE V.—PERCENT MORTALITIES OF GERMAN COCKROACHES TREATED WITH PINONIC ACID ADDUCT

| | Percent mortality, days | | | | | | | | |
|---|---|---|---|---|---|---|---|---|---|
| | 1 | 2 | 3 | 4 | 5 | 6 | 7 | 8 | 10 |
| Roach sex | | | | | | | | | |
| Male | 0 | 40 | 60 | 60 | 80 | 100 | | | |
| Female | 0 | 40 | 40 | 60 | 60 | 60 | 60 | 60 | 100 |

The pinonic acid adduct was tested for toxicity against house flies (*Musca domestica*) in the manner described in Example 10 above, using 1% of the toxicant in the dry bait. Results of this test showed all flies dead after 8 days, i.e., 100% kill, and no eggs laid.

The pinonic acid adduct was tested for toxicity against southern armyworm larvae in the manner described in Example 13 above (acetyl benzoic adduct test), at a concentration of 2 pounds of toxicant per 100 gallons of 1:1 acetone:water solution. Observation of the larvae after 2 days showed all were dead, representing a 100% kill.

While the above describes the preferred embodiments of the invention, it will be understood that departures can be made therefrom within the scope of the specification and claims.

We claim:
1. As a new composition of matter, a compound of the formula:

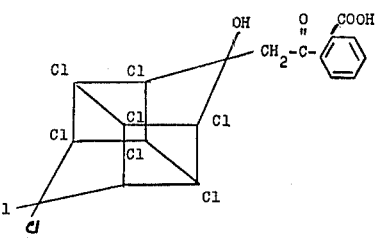

2. As a new composition of matter, a compound of the formula:

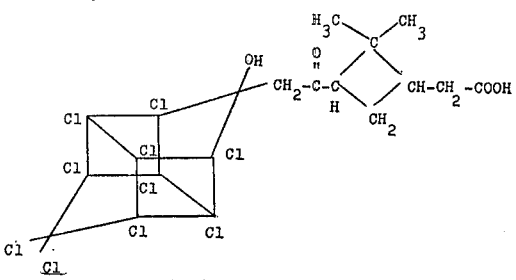

References Cited

UNITED STATES PATENTS
3,393,223   7/1968   Lombardo _____ 260—468

LORRAINE A. WEINBERGER, Primary Examiner

R. GERSTL, Assistant Examiner

U.S. Cl. X.R.

260—408, 468, 520; 424—317, 318